Nov. 18, 1969   L. C. CHOUINGS   3,479,094
FLUID PRESSURE BRAKING SYSTEMS FOR
TRACTOR-TRAILER VEHICLES
Filed April 4, 1967   7 Sheets-Sheet 2

INVENTOR
BY Leslie C Chouings
Lawrence J Winter
ATTORNEY

Nov. 18, 1969  L. C. CHOUINGS  3,479,094
FLUID PRESSURE BRAKING SYSTEMS FOR
TRACTOR-TRAILER VEHICLES
Filed April 4, 1967  7 Sheets-Sheet 7

United States Patent Office 3,479,094
Patented Nov. 18, 1969

3,479,094
FLUID PRESSURE BRAKING SYSTEMS FOR TRACTOR-TRAILER VEHICLES
Leslie C. Chouings, Leamington Spa, England, assignor to Automotive Products Company Limited, Leamington Spa, England
Filed Apr. 4, 1967, Ser. No. 628,460
Claims priority, application Great Britain, Apr. 7, 1966, 15,635/66
Int. Cl. B60t 8/12, 8/22
U.S. Cl. 303—7                           9 Claims

ABSTRACT OF THE DISCLOSURE

A hydraulic or pneumatic braking system for a tractor-trailer combination vehicle, said system incorporating sensing devices for controlling the supply of pressure fluid to the brakes of selected wheels of the tractor and trailer, one of said sensing devices being responsive to change in motion of a wheel or wheels, for example rapid deceleration which is likely to be followed by wheel locking, the other sensing device being responsive to vehicle loading.

---

Figure 1:
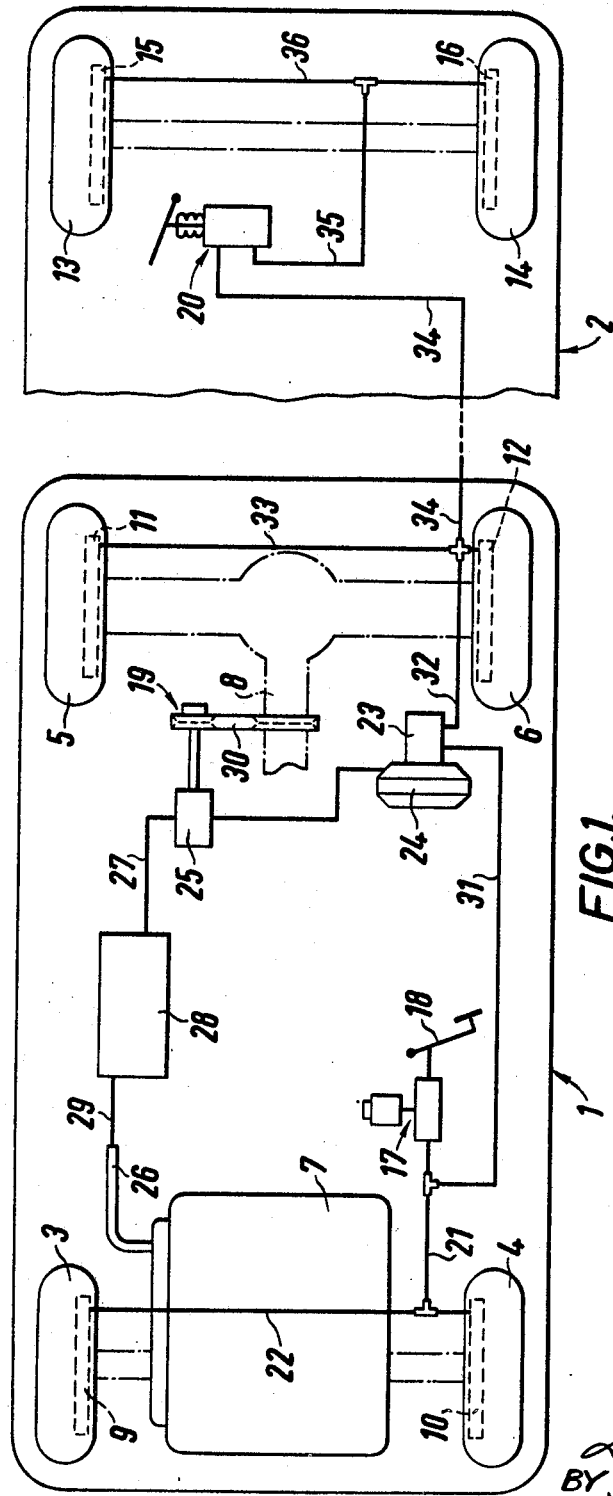

This invention relates to fluid pressure operated braking systems for tractor-trailer vehicles.

In fluid pressure braking systems for single rigid vehicles it has already been proposed to provide means for controlling automatically the fluid pressure exerted to apply the brake or brakes acting on a wheel or wheels of the vehicle as a result of a tendency for that wheel or wheels to lose ground adhesion, so that the braking can be relieved to prevent wheel locking and resulting sliding of the vehicle. For this purpose a sensing device is provided which is directly responsive to change in the motion of the wheel or wheels, for example rapid deceleration, which is likely to be followed by locking, the braking pressure on one or more wheels of the vehicle being reduced independently of the pressure produced in the master cylinder or other pressure producing device of the system by causing the sensing device to operate a valve which controls the supply of pressure fluid to the brake or brakes. In such braking systems the sensing device can be of a type referred to as the "inertia type" which comprises a fly-wheel which is rotated with the wheel or wheels of the vehicle but is free to overrun said wheel or wheels due to its inertia when the said wheel or wheels is braked heavily, the overrunning being used to produce actuation of the means for reducing the braking pressure. Further, it is also a feature of such braking systems that the closing of the valve which controls the fluid pressure supply to the brakes depends on the actuation of a fluid pressure operated control device by the sensing device. Fluid pressure braking systems for single rigid vehicles have also been proposed in which the supply of fluid pressure to the brakes is controlled automatically in accordance with variations in vehicle loading. In such systems a valve is provided to regulate the supply of pressure fluid to the brakes, the actuation of the valve being controlled by sensing means operable by variations in the vehicle loading.

The present invention has for an object to utilise the automatic control means of the above described fluid pressure operated systems to provide a braking system for a tractor-trailer vehicle so that the braking action of the brakes on wheels of both the tractor and the trailer can be controlled automatically to produce a braking action in which the possibility of locking of the wheels which could result in skidding is reduced if not eliminated thus avoiding the disadvantage known as "jack-knifing" of a tractor-trailer vehicle.

The present invention thus provides a braking system for a tractor-trailer vehicle wherein the supply of pressure to the brakes of selected wheels of the tractor vehicle and the trailer vehicle is regulated by sensing devices one at least of which is mounted on the tractor vehicle, said sensing devices being respectivly directly responsive to change in motion of a wheel or wheels, for example rapid deceleration which is likely to be followed by wheel locking and responsive to vehicle loading. A braking system according to the invention may comprise for example, two sensing devices, one for example of the "inertia" type, being responsive to change in motion of a wheel or wheels the other being responsive to vehicle loading. One of said sensing devices can be mounted on the tractor vehicle, the other on the trailer vehicle. In this particular arrangement the sensing device on the tractor vehicle can be associated with oppositely disposed wheels of the tractor vehicle, for example the driven wheels thereof so as to be responsive to a change in motion of said wheels the other sensing device being mounted on the trailer vehicle so as to be responsive to the loading thereof, the output from the sensing device on the tractor vehicle being supplied to the input of the sensing device on the trailer vehicle. Alternatively both sensing devices can be mounted on the tractor vehicle, the regulated pressure fluid supplied to the brakes of the tractor vehicle also being supplied to the brakes of the selected wheels of the trailer vehicle. The braking system of the present invention can be either a hydraulic system or a pneumatic system and particular embodiments of the invention for both such types of braking systems will now be described by way of example.

Figure 2:
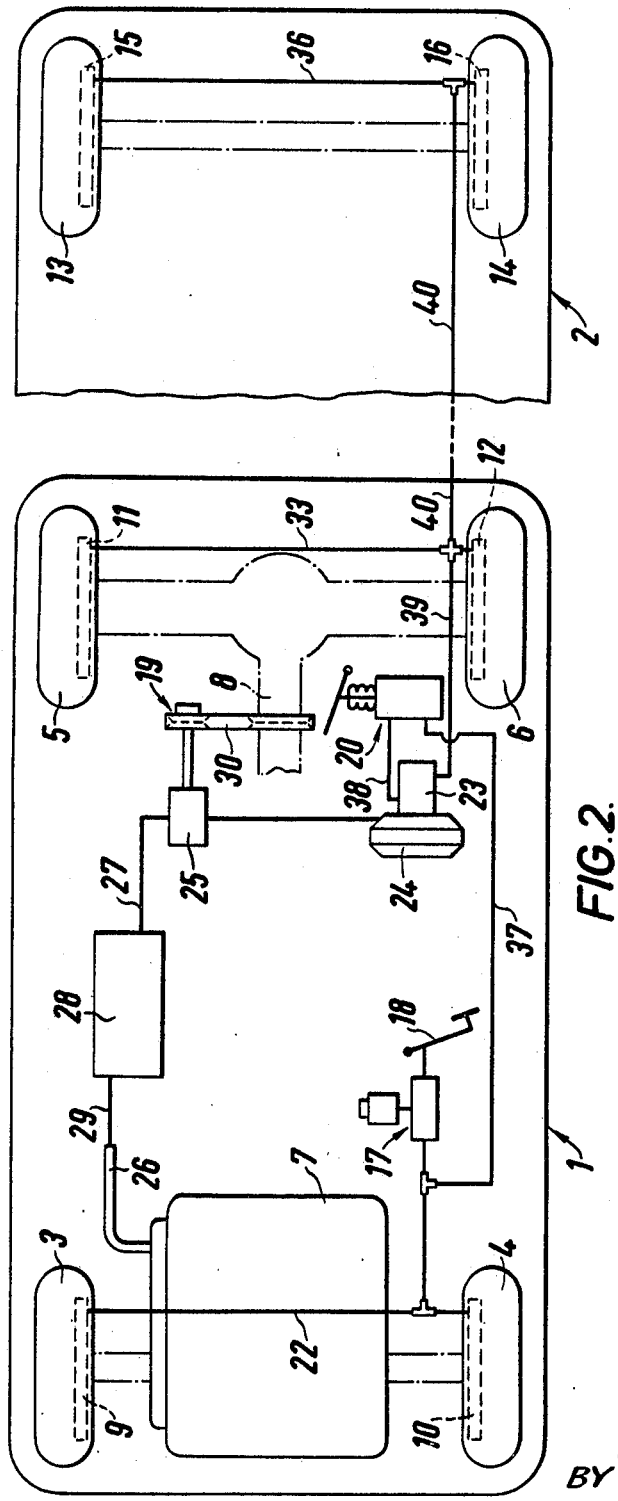
Figure 3:
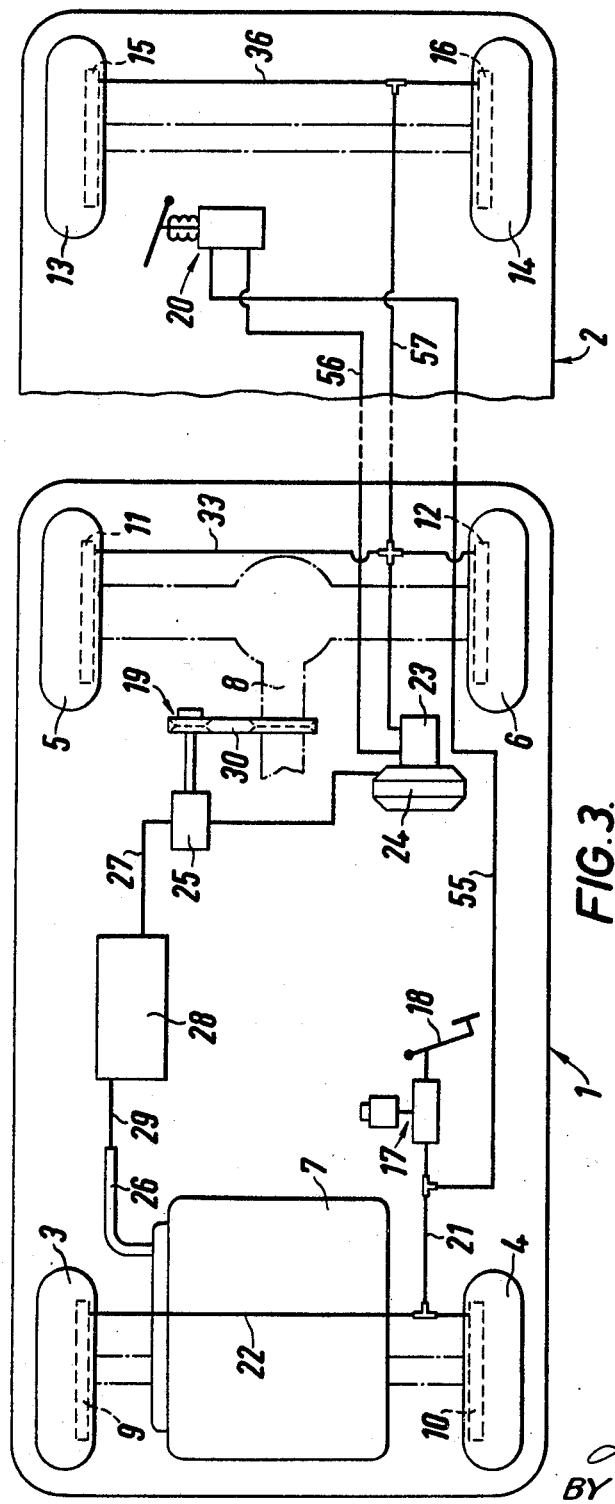
Figure 4:
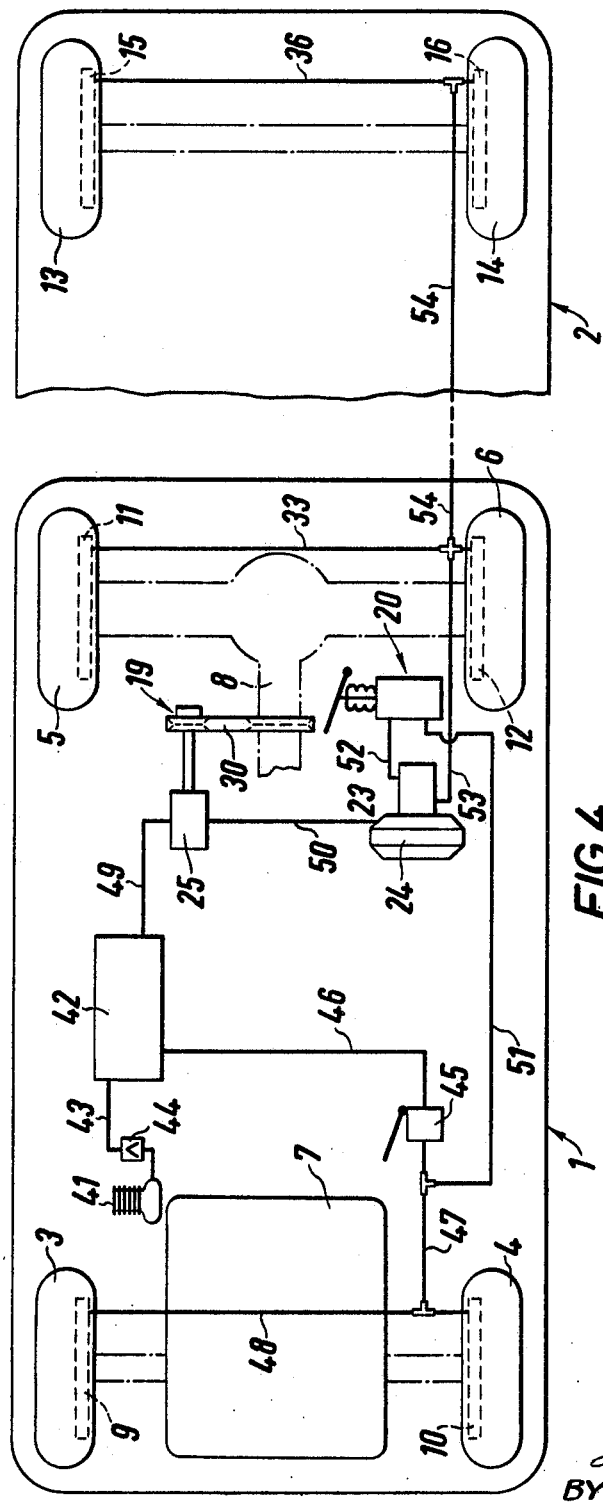
Figure 5:
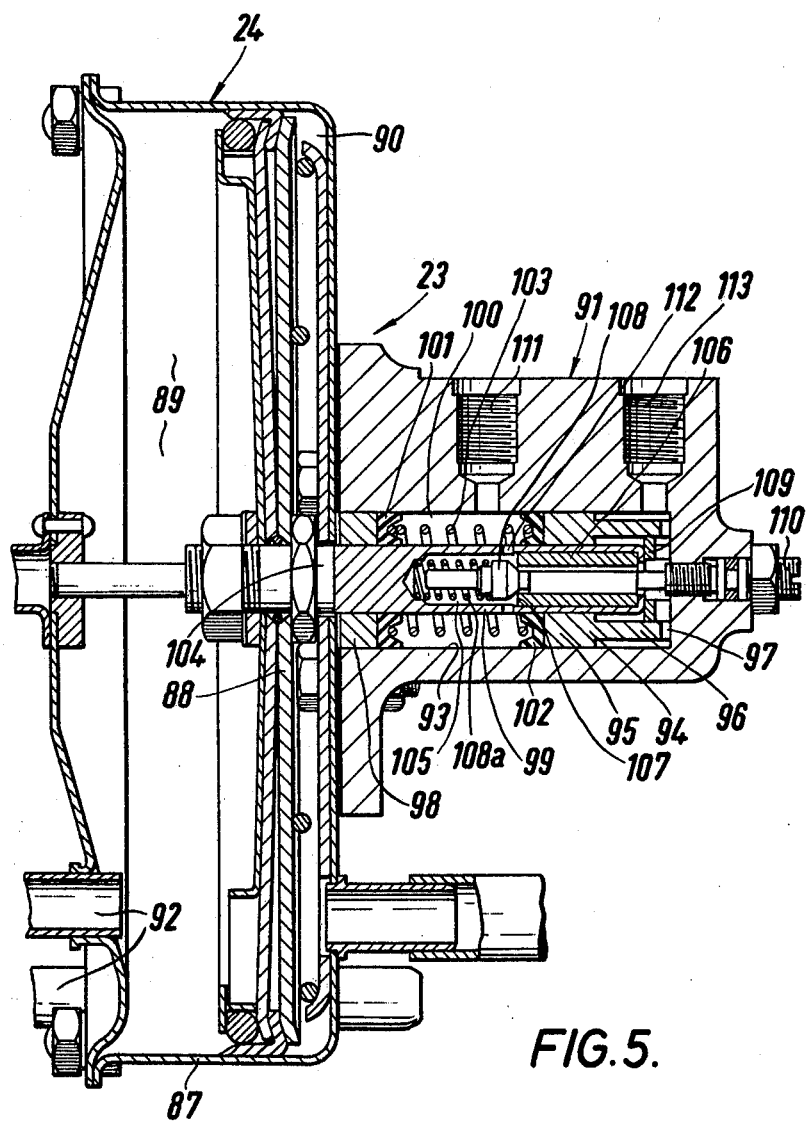
Figure 6:
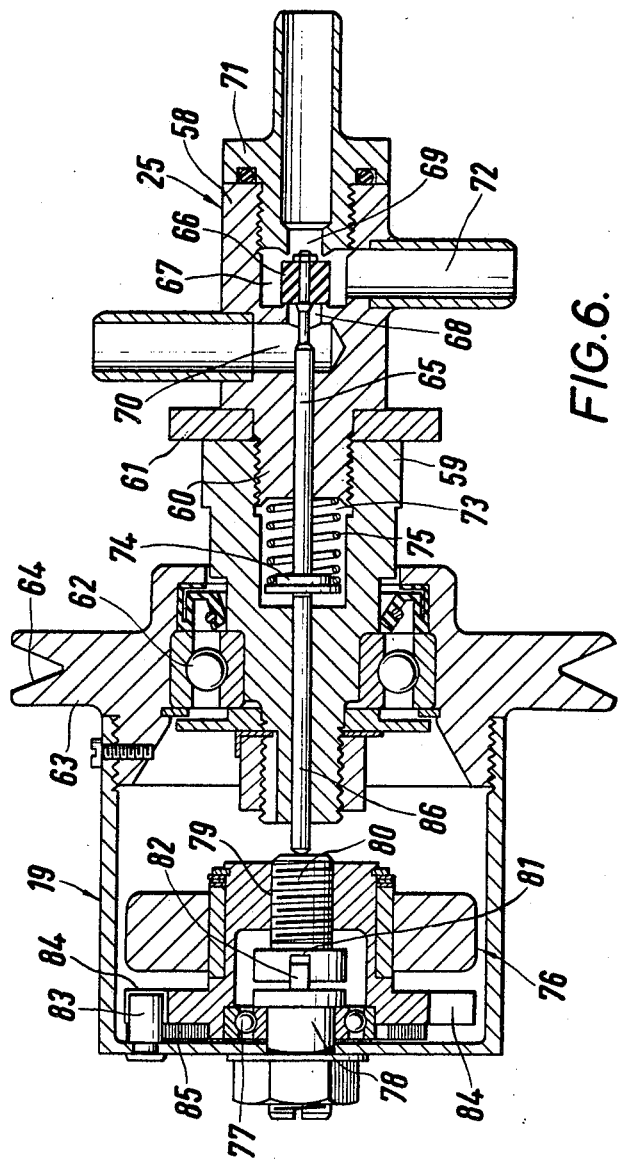
Figure 7:
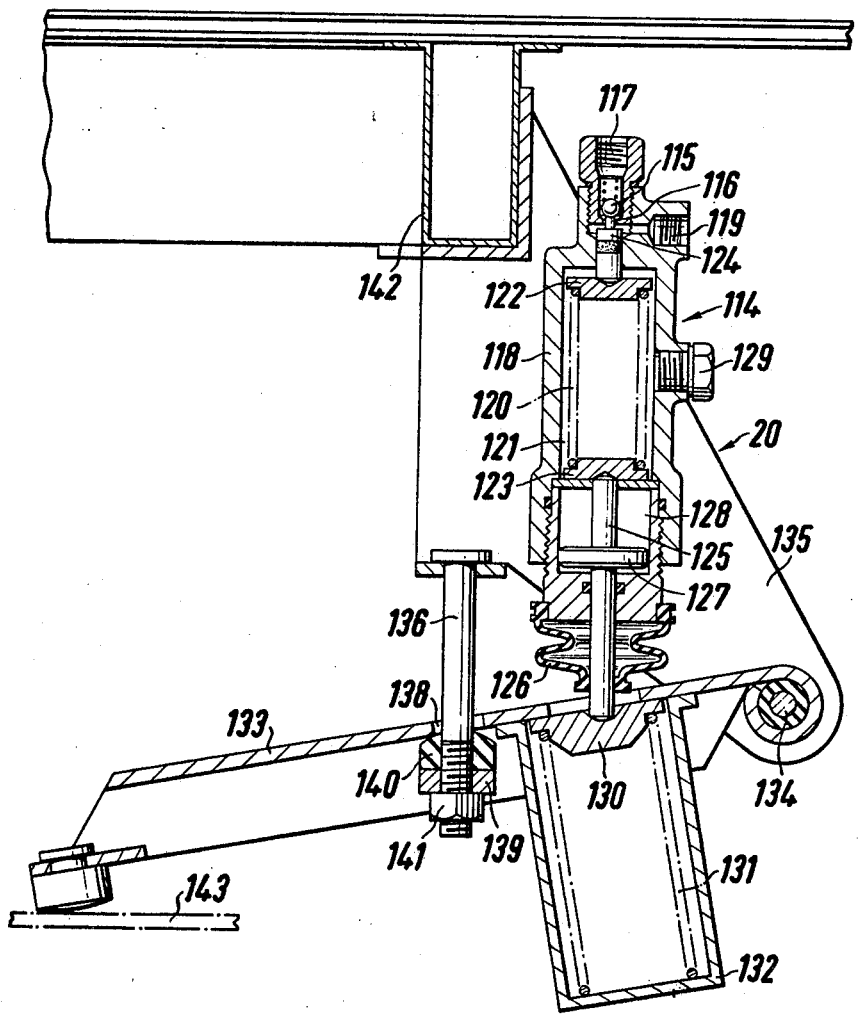

In the accompanying drawings,

FIGURE 1 shows diagrammatically in plan a tractor-trailer combination having a braking system according to a first embodiment of the invention, FIGURE 2 is a further diagrammatic view in plan of a tractor-trailer combination having a braking system according to a second embodiment, FIGURE 3 is also a diagrammatic view in plan of a tractor-trailer combination having a braking system according to a further embodiment of the invention, FIGURE 4 shows diagrammatically in plan a tractor-trailer combination having a braking system according to a still further embodiment of the invention, FIGURE 5 is a view in section of a vacuum operated control device, FIGURE 6 is a view in section of an "inertia" type sensing device, and FIGURE 7 is a view in section of a load sensing device.

Referring to the drawings in FIGURES 1 to 4 the tractor and trailer vehicles are identical and accordingly in the following description the same reference numerals are used to denote corresponding parts. The tractor vehicle is indicated generally by reference numeral 1 and the trailer vehicle indicated generally by reference numeral 2.

The tractor vehicle 1 has four wheels, two front wheels 3 and 4 and two rear wheels 5 and 6. The rear wheels are driven by an engine 7 at the forward end of the tractor vehicle chassis through transmission shaft 8 only part of which towards the rear axle, is shown. Brakes 9 and 10 are provided on the front wheels 3 and 4 respectively, brakes 11 and 12 being provided respectively on the rear wheels 5 and 6.

The trailer vehicle 2, only part of which is shown, has two wheels 13 and 14, brakes 15 and 16 being provided on the said wheels respectively, the tractor and trailer vehicles being connected one to the other by any conventional form of hitch mechanism not shown.

In the first embodiment of the invention shown diagrammatically in FIGURE 1 of the drawings a braking system for a tractor-trailer vehicle is disclosed in which both the tractor and the trailer have hydraulically operated brakes which may be either disc or drum, the brakes being operated through a tandem master cylinder of conventional construction carried by the tractor vehicle and indicated generally by reference numeral 17 the master cylinder being operable by a pedal 18. In the braking system of the present embodiment a sensing device of the "inertia" type indicated generally by reference numeral 19, is mounted on the tractor vehicle and is operable to regulate the liquid supplied to the wheel cylinders (not shown) of the brakes 11 and 12 of the rear wheels, a further sensing device indicated generally by reference numeral 20, responsive to vehicle loading being mounted on the trailer vehicle 2 and operable to regulate the liquid supplied to the wheel cylinders (not shown) of the brakes 15 and 16 of the rear wheels of the trailer.

The wheel cylinders of the brakes 9 and 10 of the front wheels 3 and 4 of the tractor vehicle are fed directly from the master cylinder 17 through a pipe line 21 which is connected to one of the outlets of the master cylinder the pipe line 21 being connected to a branch line 22 supplying the brake wheel cylinders. The wheel cylinders also not shown, of the brakes 11 and 12 of the tractor vehicle rear wheels 5 and 6 are fed indirectly through a valve indicated generally by reference numeral 23 the operation of which is controlled to regulate the liquid pressure supplied to the brake wheel cylinders by a vacuum operated control device indicated generally by reference numeral 24, the actuation of which is controlled by a valve 25 operable by the "inertia" type sensing device 19 on the tractor vehicle. The vacuum source is obtained from the exhaust manifold 26 of the engine 7 the inlet of the valve 25 being connected by a pipe line 27, reservoir 28 and pipe line 29 to the manifold 26.

This vacuum is controlled in the appropriate chamber of the device 24 in relation to the wheel behaviour in terms of whether the wheel is tending to decelerate to the extent of locking or rapidly accelerating subsequent to a point before locking. The sensing of this state of wheel deceleration or acceleration is carried out by the inertia sensitive device 19 which is driven from the tractor vehicle propeller shaft 8 through a pulley and belt drive 30. The shaft 8 is subject to proportioned rates of deceleration and acceleration of the wheels 5 and 6 under even and straight line braking. The inertia device 19 driven from the propeller shaft 8 contains a flywheel which tends to run on under deceleration and lag under acceleration, the energy available from these effects being utilised to effect axial movement of a rod which opens and closes the valve 25 in respect of deceleration to the point of wheel lock or over rapid acceleration respectively. The opening and closing of the valve 25 varies the vacuum in the pre-mentioned chamber of the control device 24 thus controlling the feed of hydraulic pressure from the valve 23 to the wheel cylinders of the brakes 11 and 12. The fluid at pressure from the master cylinder 17 is remote from the fluid at pressure in the vacuum controlled valve 23 therefore no variance in pedal load or effect in a system connected directly to the master cylinder is felt.

The hydraulic fluid for operating the rear brakes 11 and 12 is supplied to the valve 23 from the master cylinder 17 through a pipe line 31 connected to the valve inlet, the valve outlet being connected by a pipe line 32 to a branch pipe line 33 connected to the brake wheel cylinders. The brake pressure line 32 which feeds the tractor rear wheel brakes is connected so as to supply the sensed pressure to a supply line 34. This supply line is connected to the inlet of the load responsive device 20 on the trailer vehicle 2, the outlet from this device being connected by a pipe line 35 which is in turn connected to a branch pipe line 36 supplying the wheel cylinders of the trailer wheel brakes 15, 16. The device 20 comprises a brake pressure modulating valve which is controlled by the axle position in respect of the chassis, in other words, the axle will be nearer to the chassis on a laden vehicle than when the vehicle in unladen, therefore, this valve in relation to travel varies the brake line pressure at some predetermined proportion to axle load.

With the braking system of this embodiment if for example the tractor-trailer combination be unladen or on icy roads then any tendency for the rear wheels 5 and 6 of the tractor vehicle to lock is controlled by the appropriate device 19 and this sensing is also transmitted to the brakes of the wheels of the trailer vehicle which are thus operated at a pressure compatible to load so that a fine balance of braking is achieved.

With the braking system as in the above described embodiment regulation of the braking pressure of the brakes 11 and 12 on the rear wheels 5 and 6 of the tractor vehicle 1 is effected only by the inertia sensitive device 19 on the tractor vehicle whereas the regulation of the braking pressure of the brakes 15, 16 on the rear wheels 13, 14 of the trailer vehicle 2 is effected both by the said inertia device 19 and the load responsive device 20 which is on the trailer vehicle 2. However, the system can be modified so that the output from both sensing devices is supplied to the brakes of the wheels of both tractor and trailer vehicles. For this purpose, the inertia or other sensing device 19 for sensing changes in wheel motion and the load responsive device 20 are both mounted on the tractor vehicle to provide a single regulated output which is delivered to the wheel cylinders of the brakes of the rear wheels of the tractor vehicle 1 and also the wheel cylinders of the brakes of the rear wheels of the trailer vehicle 2.

FIGURE 2 of the accompanying drawings shows diagrammatically a braking system for a tractor-trailer vehicle according to this modified embodiment of the invention. In the braking system shown in FIGURE 2 the same reference numerals are used to denote parts thereof which correspond to parts of the braking system of FIGURE 1. As in the embodiment disclosed in connection with FIGURE 1 hydraulic liquid is supplied from the master cylinder 17 to the brakes 9 and 10 of the front wheels 3, 4 of the tractor vehicle through pipe lines 21 and 22. Also vacuum for the vacuum operated control device 24 is obtained from the exhaust manifold 26 of the engine 7, the inlet of the valve 25 being connected by pipe line 27, reservoir 28 and pipe line 29 to the manifold 26.

In the present embodiment hydraulic fluid from the master cylinder 17 for operating the brakes 11 and 12 of the tractor wheels 5 and 6 is obtained through a pipe line 37 which is connected to the inlet of the load sensitive device 20 mounted on the tractor vehicle. The outlet from the device 20 is connected by a pipe line 38 to the inlet of the valve 23 the outlet from valve 23 being connected by a pipe line 39 to the wheel cylinders of the brakes 11 and 12 through the branch pipe line 33. The hydraulic liquid from pipe line 39 is also fed to the wheel cylinders of the brakes 15 and 16 of the wheels 13 and 14 of the trailer vehicle through a pipe line 40 connected between pipe line 39 and branch pipe line 36.

In the braking systems according to the above described embodiments if the trailer load be unevenly distributed then it is possible to cause the load responsive device to send an incorrect signal depending on whether the load is biased to the tractor axle or the trailer axle and with which of these axles the load responsive device is associated.

To overcome this two vacuum controlled valves can be provided one to supply a load responsive device on the tractor vehicle and the second a load responsive device on the trailer axle or axles. Thus both tractor and trailer axles are each controlled in relation to skid resistance by the tractor axle and each axle is independently controlled with respect to load. This particular braking system provides for even a finer balance of braking.

The braking system of the present invention may also be pneumatically operated instead of hydraulically operated as in the above described embodiments. The pneumatically operated system incorporates a compressor driven from the engine of the tractor vehicle the compressor output being connected to an air pressure reservoir for supplying compressed air to the brakes upon actuation of a treadle valve. The regulation of the air pressure supplied to the brakes is effected by a sensing device, for example a sensing device of the inertia type as above referred to and by a load responsive device also for example of the type above referred to, said devices being arranged and operating as in any of the particular embodiments above described.

A braking system according to this embodiment of the invention is shown diagrammatically in FIGURE 4 of the accompanying drawings. In FIGURE 4 where possible the same reference numerals are used to denote parts which correspond to parts of the braking systems in the previously described embodiments. In the present embodiment compressed air for the operation of the air brakes 9, 10, 11, and 12 of the tractor and the air brakes 15, 16 of the trailer vehicle is obtained from a compressor 41 mounted on the tractor vehicle 1 and driven by the engine 7. The output from the compressor is delivered to a reservoir 42 through pipe line 43 which incorporates a one-way valve 44. The supply of compressed air from reservoir 42 to the brakes is controlled by a treadle valve 45 the inlet of which is connected by pipe line 46 to the reservoir. The outlet from the treadle valve 45 is connected by a pipe line 47 to a branch line 48 supplying the wheel cylinders of the air operated brakes 9 and 10 of the tractor front wheels 3 and 4.

The inertia type control device 19 mounted on the tractor vehicle is driven by the pulley and belt drive 30 from the transmission shaft 8 and controls operation of the valve 25. The fluid pressure operated control device 24 is air operated, the compressed air supply being obtained from reservoir 42 the air being supplied to the inlet of valve 25 through pipe line 49 the valve outlet being connected by pipe line 50 to the device 24.

Compressed air for the actuation of the brakes 11 and 12 of the tractor rear wheels 5 and 6 and the brakes 15, 16 of the trailer wheels 13, 14 is supplied from the outlet side of the treadle valve 45 through a pipe line 51 which is connected to the inlet of the load sensing device 20 mounted on the tractor vehicle, the outlet from this sensing device being connected by a pipe line 52 to the inlet of valve 23. The outlet from valve 23 is connected by a pipe line 53 to the branch pipe line 33 connected to the wheel cylinders of the brakes 11 and 12 of the rear wheels 5 and 6 of the tractor vehicle. A further pipe line 54 forming an extension of the pipe line 53 is connected to the branch pipe line 36 on the trailer vehicle 2 which supplies the wheel cylinders of the brakes 15, 16 of the wheels 13 and 14 of the trailer vehicle.

In the braking system according to the invention it is advantageous to position the load responsive device in advance of the vacuum or air pressure on-off expansion chamber valve of the control device so that the latter will have less work to do in regulating the pressure. If, for example, the vehicle were unladen and the wheels about to lock, the pressure to be dissipated subsequent to passing through the load responsive device would be considerably less than master cylinder or treadle valve pressure. FIGURE 3 of the accompanying drawings shows diagrammatically a braking system arranged in this manner, the load responsive device 20 being mounted on the trailer vehicle 2, the inertia type sensing device 19 being on the tractor vehicle 1.

In FIGURE 3, the same reference numerals have been used to denote parts which correspond to the same parts in the previously described embodiments. In the braking system according to this embodiment the brakes are hydraulically operated hydraulic fluid being obtained from the pedal operated master cylinder 17 on the tractor vehicle. The pipe line 21 supplies hydraulic fluid from the master cylinder through the branch pipe line 22 to the wheel cylinders of the brakes 9 and 10 of the front wheels 3 and 4 of the tractor vehicle 1. The pressure operated control device 24 is vacuum operated, vacuum being obtained from the manifold 26 of engine 7, the supply of vacuum being controlled by valve 25 associated with the inertia type sensing device 19 on the tractor vehicle 1. The load sensing device 20 on the trailer vehicle has its inlet connected by a pipe line 55 to the outlet side of the master cylinder 17. The outlet from this device is connected by a pipe line 56 to the inlet of the valve 23 the outlet of this valve being connected by a pipe line 57 to the branch pipe line 36 supplying the wheel cylinders of the brakes 15 and 16 of the wheels 13 and 14 on the trailer vehicle 2, the pipe line 57 also being connected to the branch pipe line 33 supplying the wheel cylinders of the brakes 11 and 12 of the wheels 5 and 6 of the tractor vehicle 1.

The inertia type sensing device 19 and the pressure operated control device 24 with valve 23 can be as disclosed in British specification No. 935,630 the load sensing device being as disclosed in connection with FIGURES 1 to 4 of the drawings of British specification 1,017,391.

A combined unit comprising the inertia type sensing device 19 and valve 25 is shown in FIGURE 6 of the accompanying drawings.

The valve 25 which is fixed in any suitable manner to the vehicle adjacent the transmission shaft 8 comprises a body formed in two parts 58 and 59 one of which has a screw threaded projection 60 screwing into the other to clamp between the said parts a fixing bracket 61. On the part 59 is mounted a ball bearing 62 rotatably supporting a drum like casing 63 having formed therein a V-pulley 64 to receive the V-belt. A rod 65 slidable in a longitudinal bore in the projection 60 carries a valve head 66 disposed in a valve chamber 67 in the part 58 of the valve body, the valve head 66 being movable between two valve seats one at each end of the chamber and surrounding respectively two ports 68 and 69. The port 68 leads into a transverse drilling 70 in the valve body part 58 which drilling is connected to the atmosphere, and the port 69 which is formed in a plug 71 closing the valve chamber 67 is connectable by a pipe line to the vacuum reservoir or air reservoir. A third port 72 opening laterally into the valve chamber 67 is connected by a pipe line to the control device 24.

The rod 65 extends into a cavity 73 in the valve body part 59 and carries a head 74 in that cavity on which acts a spring 75 urging the valve head 66 on to the seat around the port 68. A flywheel unit 76 is mounted on a ball bearing 77 on a stud 78 in the drum-like casing 63, the flywheel unit 76 having a screw-threaded bore 79 in which is engaged a screw-threaded stud 80 having a diametral slot 81 in one end which is engaged by a diametral key 82 in the stud 78 so that the two studs are held against relative rotation. Rotation of the flywheel unit 76 in the casing 63 is limited by a peg 83 fixed in the said casing and co-operating with a pair of opposed radial arms 84 on the flywheel unit, and a spiral spring 85 anchored at one end to the flywheel unit and at the other end to the peg 83 urges the said flywheel unit in the direction opposite to that in which it is rotated by the transmission shaft 8 during forward movement of the vehicle, to urge one of the arms 84 against the peg 83. A rod 86 slidable in a bore in the valve body part 59 engages at one end with the stud 80 and at the other end with the head 74 of rod 65.

The spring 85 is so calibrated that, at a predetermined rate of deceleration of the rear wheels, the inertia of the flywheel unit 76 overcomes it, and the flywheel unit then turns relative to the casing 63, the screw thread connection between the flywheel unit and the stud 80 being such that this relative turning movement moves the stud 80 axially towards the valve body, transmitting thrust through the rods 86 and 65 to the valve head 66 which is thus moved clear of the seat around the port 68 and on to the seat around the port 69.

Referring now to FIGURE 5 which shows one embodiment of fluid pressure operated control device comprising a unit consisting of the servo-motor 24 and valve 23. The servo-motor 24 comprises a cylindrical body 87 in which is slidably mounted a piston 88 dividing the interior of the said body into two chambers 89 and 90. A valve body 91 is secured co-axially to the end wall of the servo-motor body 87 defining one end of the chamber 90, and that chamber is connected by a conduit to the valve 25. The other chamber 89 of the servo-motor is open to the atmosphere through a conduit 92 having an air filter at its open end.

The valve body 91 has formed in it a cylindrical bore 93 which is closed at one end. A sleeve member 94 is mounted in the closed end of the bore 93 the sleeve member 94 having a portion 95 which fits closely in the bore 93 and a thinner portion 96 formed by cutting away both its external and internal surfaces, the thinner portion 96 which abuts against the closed end of the bore 93 being notched at its end, as shown at 97 to provide communication between the internal bore of the sleeve member and the annular space about its thinner portion. A collar 98 having the same internal diameter as the portion 95 of the sleeve member 94 fits in the open end of the bore 93 being retained therein by the end wall of the servo-motor body, and a plunger 99 is slidably mounted in the collar and sleeve member so as to extend across a chamber 100 defined between them. Annular lipped packings 101, 102 urged against the end surfaces of the collar and sleeve member by a spring 103 in the chamber 100 provide a fluid-tight seal between the said collar and sleeve member, and the wall of the bore 93 and also between the said collar and sleeve member and the surface of the plunger 99. The plunger 99 is engaged at its end which passes through the collar 98 by a stud 104 on the piston 88 of the servo-motor, and when suction acts in the chamber 90 of the servo-motor, the atmospheric pressure in the chamber 89 thereof causes the plunger 99 to be urged towards the closed end of the valve bore 93. A cavity 105 is formed in the plunger, extending axially thereinto from the end of the plunger adjacent the closed end of the valve bore 93 and a sleeve 106 retained in the said cavity by turning inwardly the end of the annular wall enclosing the cavity provides at its inner end a valve seat 107 for a valve member 108 guided by means of a non-circular stem sliding in the sleeve 106 and urged towards the seat 107 by a spring 108a in the cavity 105. An annular stop member 109 limits travel of the plunger 99 towards the closed end of the valve bore 93, and an adjustable stop pin 110 engaged in a screw-threaded hole in the closed end of the valve bore 93 limits the travel of the valve member 108 to such an extent that, when the plunger 99 is in engagement with the stop member 109, the valve member 108 is held off its seat.

A passage 111 in the valve body 91 leads into the chamber 100 which is connected by ports 112 in the plunger 99 to the cavity 105, and a second passage 113 in the valve body leads into the annular space around the thinner portion 96 of the sleeve member 94. The passage 111 is connected by a conduit to the master cylinder 17, and the passage 113 is connected by a conduit to the rear brakes of the tractor vehicle.

During normal movement of the vehicle, the valve member 66 is held on the seat surrounding the port 68 by the spring 75 and the chamber 90 of the servo-motor 24 is therefore connected to suction, with the result that the plunger 99 is held against the stop member 109 and the valve member 108 is held off its seat. Pressure created in the master cylinder 17 to operate the brakes is therefore transmitted to the motor cylinders of the brakes. If, however, the brakes are applied with sufficient force to produce a rate of deceleration of a wheel or wheels of the vehicle such that the inertia of the flywheel unit 76 rotating therewith overcomes the spring 85 the flywheel unit turns on the stud 78 and the stud 80 is moved axially to displace the valve member 66 on to the seat around the port 69. The chamber 90 of the servo-motor 24 is thus connected to the atmosphere, removing the thrust exerted by the servo-motor piston 88 on the plunger 99. Since the plunger 99 is acted on by the liquid pressure in the braking system this liquid pressure tends to displace the said plunger away from the closed end of the valve bore. After a short movement, the valve member 108 seats, isolating the brakes from the master cylinder, and the plunger 99 continues to move until the pressure acting on the brakes falls substantially to the pressure of the surrounding atmosphere. The application of the brakes to the rear wheels is therefore relieved, and the risk of sliding of those wheels is removed. As soon as the rate of deceleration of the wheel or wheels decreases sufficiently for the spring 85 to return the flywheel unit to its normal position, the chamber 90 of the servo-motor is again subjected to suction and the plunger 99 is moved to re-open the connection between the master cylinder and the rear brakes, so that those brakes are again applied.

The load sensing device 20 shown in FIGURE 7 of the drawings consists of a valve indicated generally by reference numeral 114. The valve has a ball 115 as the movable valve member which co-operates with a valve seating 116 to control the flow of pressure fluid between an inlet 117 in the valve body 118 and an outlet 119. The valve seating 116 and inlet 117 for pressure fluid are arranged so that pressure from the pressure source urges the ball onto its seating, the ball being spring loaded so as normally to be urged away from its seating. The spring 120 acting on the ball is disposed on the side of the valve seat remote from the inlet 117 and is contained in a housing 121 provided in the valve body. The spring 120 is located between spring end plates 122 and 123 the spring loading being transmitted to the ball to apply an unseating thrust thereto by a plunger 124 which extends through the valve seating with sufficient clearance to permit the flow of pressure fluid. One end of the plunger contacts the ball and the other end is in contact with the spring end plate 122, the ball being seated when the pressure in the pressure source reaches a valve sufficient to overcome the action of the spring 120. The spring end plate 123 at the end of the spring 120 remote from the ball contacting plunger 124 is in contact with the inner end of a rod 125 which projects outwardly from the spring housing a suitable flexible type boot 126 being provided around the rod to prevent the ingress of dirt and moisture.

A piston 127 is carried by the rod 125 and disposed intermediate the length thereof the piston 127 being located in a hydraulic cylinder 128 forming an extension to the spring housing 121 in which the spring 120 acting on the ball valve plunger 124 is located. A filler plug 129 for hydraulic fluid is provided in the valve body 118.

The outer end of the rod 125 is hemi-spherical and is located in a correspondingly shaped recess in a pressure plate 130 located at one end of a compression spring 131 contained within a casing 132 carried by an arm 133 which is pivotally mounted about one end on a pivot pin 134 carried between the bifurcated end of a bracket 135 secured to the valve body 118. The pivot pin 134 extends at right angles to the axis of the rod 125 and is offset to one side thereof so that pivotal movement of the arm 133 in one direction referred to as inward movement, causes the rod 125 to move inwardly to compress the spring acting on the plunger 124 in contact with the ball valve 115 thus increasing the spring loading, pivotal movement of the arm in the opposite direction referred to as outward pivotal movement, permitting the said spring 120 to expand to reduce the spring loading on the ball valve 115. The outward pivotal movement of the arm 133 is limited by stop means consisting of a bolt 136 supported by the bracket 137, the shank of the bolt passing through a clearance hole 138 in the arm 133. The threaded end of the bolt has a nut 139 supporting a bush 140 against the opposite face of the arm 133. By rotation of the nut 139 the rest or angular position of the arm 133 can be adjusted a lock nut 141 securing the nut 139 in the adjusted position. The characteristics of the compression spring 131 are such that displacement of the arm can take place relative to the member 130, when the vehicle is travelling over uneven ground so that further operation of the valve by the sensing means is avoided under such conditions.

In use the valve is mounted on a cross channel member 142 supporting the platform of the vehicle, the free end of the arm 133 being in contact with a bracket plate 143 secured to the rear axle of the vehicle. Thus as the load in the vehicle is increased and the platform or floor moves downwardly relative to the axle under the load, the arm 133 pivots inwardly with the result that the spring loading acting on the ball is increased, reverse movement of the arm occurring when the vehicle load is reduced. The piston 127 and cylinder 128 provides a dashpot device which absorbs shocks and prevents hunting from the actuating means.

What is claimed is:

1. A braking system for a tractor-trailer vehicle comprising fluid pressure operated brakes acting on at least the wheels of the tractor vehicle, brakes acting on wheels of the trailer vehicle, a fluid pressure supply system operatively connected to said brakes, and means to regulate the supply of fluid pressure to wheels of the tractor vehicle and to wheels of the trailer vehicle, said regulating means comprising a first sensing device directly responsive to rotative change in motion of said tractor wheels and including valve means operative to reduce the pressure acting on the brakes on at least the last mentioned wheels in relation to the source pressure, and a second sensing means responsive to vehicle loading and including second valve means closable to shut off the brakes on at least the trailer wheels from the pressure source when the pressure acting in said second valve means reaches a value which varies with the said vehicle loading, at least one of said sensing being mounted on the tractor vehicle.

2. A braking system according to claim 1, each of said sensing devices comprising fluid inputs and outputs.

3. A braking system according to claim 2 wherein one of the sensing devices is mounted on the tractor vehicle the other being mounted on the trailer vehicle.

4. A braking system according to claim 3 wherein the sensing device on the tractor vehicle is associated with oppositely disposed wheels of the tractor vehicle, for example the driven wheels thereof so as to be responsive to a change in motion of said wheels, the other sensing device being mounted on the trailer vehicle so as to be responsive to the loading thereof, the output from the sensing device on the tractor vehicle being supplied to the input of the sensing device on the trailer vehicle.

5. A braking system according to claim 2 wherein both sensing devices are mounted on the tractor vehicle, the regulated pressure fluid supplied to the brakes of selected wheels of the tractor vehicle also being supplied to the brakes of selected wheels of the trailer vehicle.

6. A braking system according to claim 2, wherein the sensing device responsive to change in motion of a wheel or wheels is of the "inertia" type.

7. A braking system for a tractor-trailer vehicle wherein the supply of pressure to the brakes of selected wheels of the tractor vehicle and the trailer vehicle is regulated by sensing devices mounted solely on the tractor-trailer vehicle, one sensing device comprising apportionate fluid chamber means having an input and output and driven rotative means interconnected to the fluid pressure supply of the brakes to be directly responsive to rotative change in motion of wheels of the tractor and rapid deceleration thereof to prevent wheel locking and, the other sensing device being responsive to vehicle loading, each of said sensing devices comprising fluid inputs and outputs, said one sensing device being of the "inertia" type, and said other sensing device comprising a valve having a spring loaded valve member which is unseated by the spring action and means for varying the spring loading action on the valve, said means being operable to vary the spring loading in accordance with vehicle loading.

8. A braking system according to claim 7, wherein the brakes are hydraulically operated.

9. A braking system according to claim 7, wherein the brakes are pneumatically operated.

References Cited

UNITED STATES PATENTS

| | | | |
|---|---|---|---|
| 2,242,297 | 5/1941 | Freeman | 303—6 X |
| 3,084,002 | 4/1963 | Peras | 303—6 X |
| 3,093,422 | 6/1963 | Packer et al. | 303—6 X |
| 3,140,124 | 7/1964 | Heiland | 303—6 |
| 1,926,296 | 9/1933 | Merchie | 303—21 X |
| 2,181,161 | 11/1939 | Wolf. | |
| 3,159,729 | 12/1964 | Stelzer et al. | 303—21 X |
| 3,297,368 | 1/1967 | Cumming | 303—22 |

MILTON BUCHLER, Primary Examiner

JOHN J. McLAUGHLIN, Jr., Assistant Examiner

U.S. Cl. X.R.

303—21, 22, 24